Sept. 23, 1969      I. LEVINE      3,468,054
ELECTRICAL RODENT EXTERMINATOR
Filed Aug. 15, 1967      2 Sheets-Sheet 1
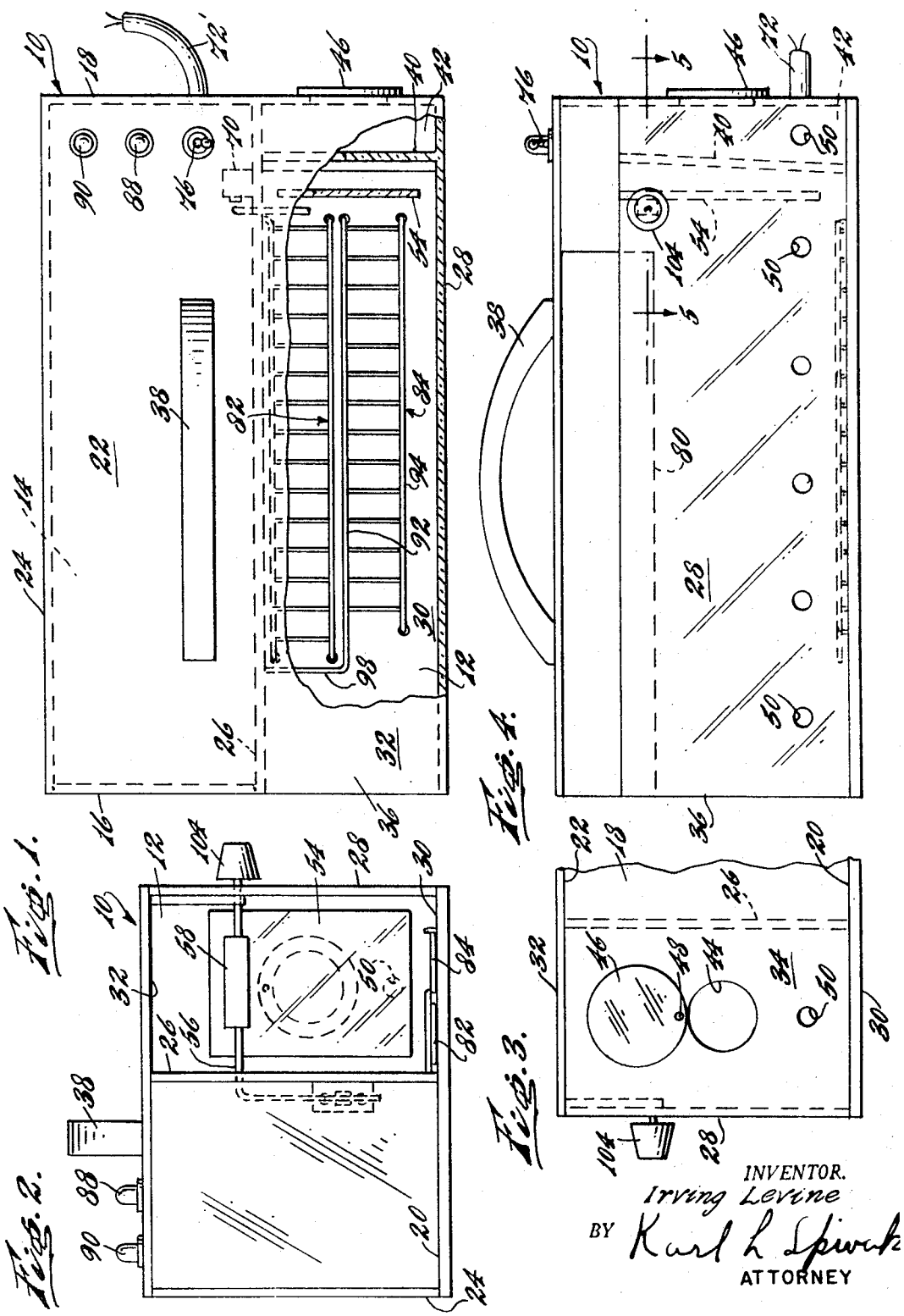
INVENTOR.
Irving Levine
BY Karl L. Spivak
ATTORNEY

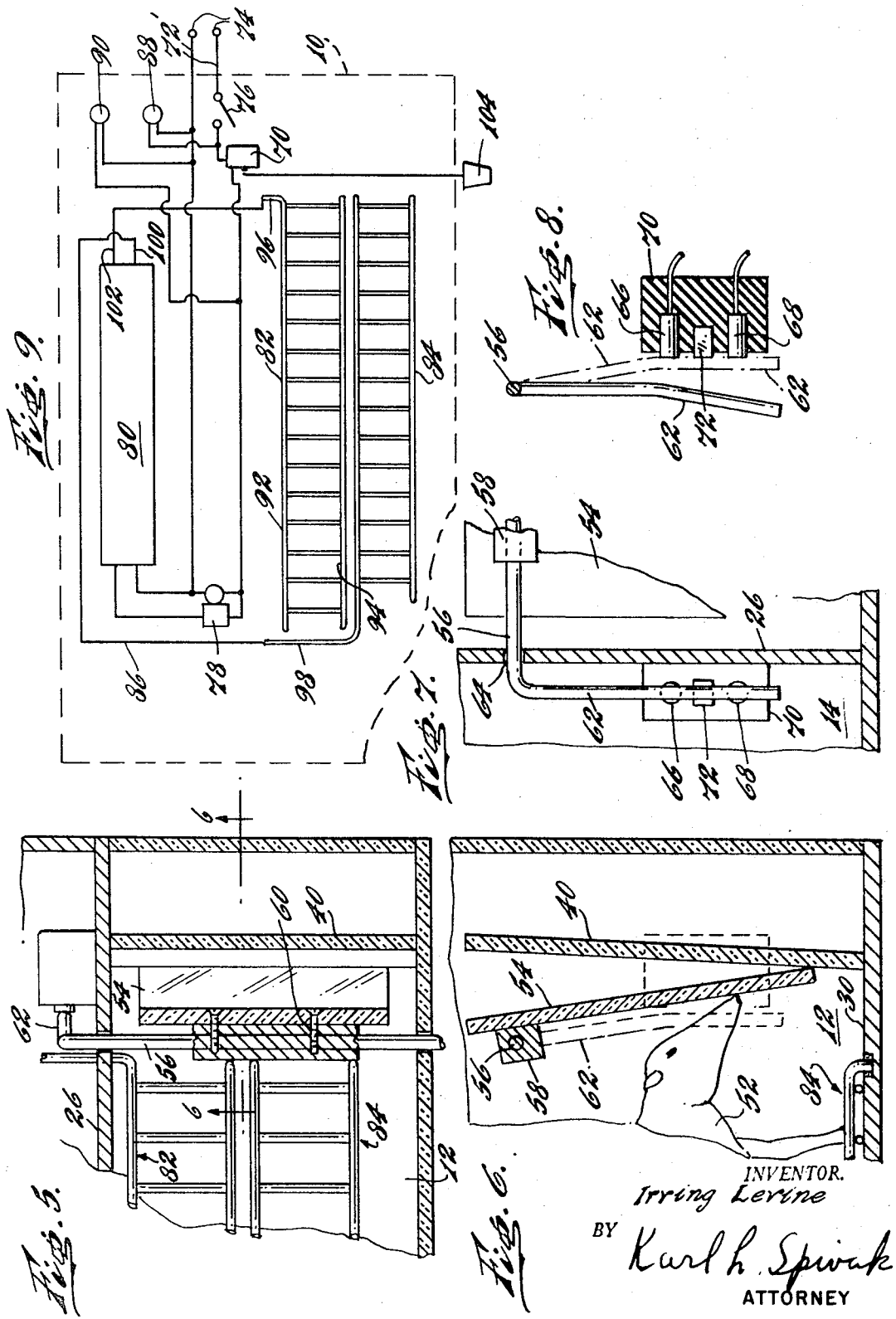

United States Patent Office 3,468,054
Patented Sept. 23, 1969

3,468,054
ELECTRICAL RODENT EXTERMINATOR
Irvin Levine, 509 Burghley Ave.,
Ventnor, N.J. 08406
Filed Aug. 15, 1967, Ser. No. 660,792
Int. Cl. A01m 19/00
U.S. Cl. 43—98          1 Claim

ABSTRACT OF THE DISCLOSURE

An electrical rodent exterminator including a pair of high voltage grids affixed to the floor of a compartmented bait holding enclosure. A swinging baffle is rearwardly positioned within the enclosure to activate a timed cycle of high voltage current flow through the grids upon movement of the baffle by a rodent.

This invention relates to the general field of rodent extermination, and more particularly is directed to a high voltage device designed to be tripped by the rodent itself and further provided with a self-timer to closely regulate timed periods of current flow through the high voltage device.

Many prior art workers in the field have tried to successfully produce an electrically operated rodent exterminator but all have had some type of serious shortcoming. For example, I am familiar with a board-like device wherein a base member was provided with a plurality of electrically energized plates and the bait was placed in the center. The rodent could electrocute itself by skipping simultaneously upon oppositely charged plates. This device could perhaps operate satisfactorily with a single rodent, but once the animal died, the continuing electrical charge would cause charring of the carcass and would thus frighten off any additional rodents.

Later workers in the field have incorporated movable platform doors above an electrical grid which is actuated upon receiving a rodent to close contacts for providing electric current to grids for shocking the rodent. Such doors complicated the enclosure and made removal of the dead rodent an unpleasant and unhealthy chore.

Other prior inventors in this field have devised complicated, expensive and cumbersome equipment without attaining any major advantages in view of the expense and effort put forth.

It is therefore an object of the instant invention to provide an improved device of the type set forth.

It is another object of the instant invention to provide an electrical rodent exterminator that is completely self-contained and needs only to be connected to an ordinary electrical convenience outlet to be ready for use.

It is another object of this invention to provide an electrical rodent exterminator that incorporates the use of a step-up electrical voltage transformer.

It is another object of the instant invention to provide an electrical rodent exterminator designed with a high voltage circuit and time clock control means to regulate the duration of periods of operation of the said high voltage circuit.

It is another object of the instant invention to provide an electrical rodent exterminator that is simple in construction, inexpensive in manufacture and trouble-free upon use.

It is another object of the instant invention to provide an electrical rodent exterminator that has a minimum number of components, the said components being easy to assemble, simple to construct and which will have an effective action over a long period of time.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 1 is a top plan view of an electrical rodent exterminator, partially broken away to expose the internal construction.

FIG. 2 is a front elevational view thereof.

FIG. 3 is a partial, rear elevational view thereof.

FIG. 4 is a side elevational view thereof.

FIG. 5 is an enlarged partial, cross sectional view taken along line 5—5 of FIG. 4, looking in the direction of the arrows, showing the baffle in closed position.

FIG. 6 is a cross sectional view taken along line 6—6 of FIG. 5, looking in the direction of the arrows.

FIG. 7 is a front elevational detail showing the operation of the magnet equipped switch.

FIG. 8 is a side elevational detail, partially in section, showing the operation and internal construction of the magnet equipped switch.

FIG. 9 is a schematic, electrical circuit diagram.

Although specific terms are used in the following description for the sake of clarity, these terms are intended to refer only to the particular structure of my invention selected for illustration in the drawings and are not intended to define or limit the scope of the invention.

Referring now to the drawings, I show in FIGS. 1–4 the novel electrical rodent exterminator having an outer casing 10 which may be molded from a plastic material of any well-known type that possesses the required strength, permanence insulating qualities and stability for the duty. Optionally, the casing could also be fabricated of wood. As best seen in FIGS. 1 and 2, the casing 10 is longitudinally compartmented into a rodent entrance chamber 12 and an electrical equipment chamber 14.

The electrical equipment chamber 14 is defined by parallel, vertical front and rear walls 16, 18 and parallel, horizontal partitions forming the floor 20 and the roof 22. The left casing side wall 24 and the longitudinal divider 26 which is parallel to and spaced therefrom serve to complete the chamber enclosure 14. If desired, any of the walls 16, 18, 20, 22 may be made easily removable, in any well-known manner, such as by screws, to gain easy access into the interior of the chamber 14.

The rodent entrance chamber 12 is laterally defined by the vertical divider 26 and the right casing side wall 28 and vertically by the chamber floor 30 which is co-extensive with the roof 22. The chamber rear is closed by the bait receiving wall 34 which extends from the lateral wall 26, 28 and from the floor 30 to the roof 32. It should be noted the front of the chamber is open as at 36 to permit ready access by a rodent during all operating periods. A carrying handle 38 affixes to the roof 22 above the center of gravity of the casing to permit ready transportation of the unit or to permit removal of a dead rodent carcass without the need of any manual handling whatsoever, all as hereinafter more fully described.

The rodent entrance chamber 12 is rearwardly partitioned by a baffle 40 to form a bait holding chamber 42 defined longitudinally between the baffle 40, the bait receiving wall 34 and laterally by the divider 26 and the right side wall 28. As seen in FIG. 3, the wall 34 is drilled or otherwise cut to provide a bait receiving opening 44 which may be of any desired configuration. A cover 46 pivots about the pin 48 to optionally expose or close the opening 44 when the device is being readied for service. A plurality of small openings 50 are provided in the walls 34, 28, and in the baffle 40 to permit the odor of the bait (not shown) to escape from the casing 10 to thus attract a rodent 52. By spacing the openings 50 along the side wall 28, the rodent will be led and encouraged into the open chamber front 36 towards the bait.

A swinging baffle 54 pivots about the horizontal portion of the operating rod 56 and is affixed thereto by a connecting block 58 which attaches near the top of the baffle as by screws 60, thereby permitting the bottom thereof to swing freely. The operation of the swinging baffle 54 may best be observed in FIGS. 5 and 6 wherein it can be seen that the rodent 52 itself causes the baffle 54 to swing inwardly until its movement is halted upon contact with the baffle 40.

Referring now to FIGS. 5–8, it will be observed that the operating rod extension 62 enters the electrical equipment chamber 14 through an opening 64 in the divider 26 and is journalled therein in any well-known manner to facilitate the pivotal action of the swinging baffle 54. When the baffle 54 is initially set, the rod extension 62 depends substantially vertically as shown in full lines in FIG. 8. When the baffle is inwardly pivoted by the action of the rodent approaching the bait, the rod extension also swings inwardly and assumes the position illustrated in broken lines in FIGS. 6 and 8. It is thus seen that the rod extension 62 serves to close the switch contacts 66, 68 of the trip switch 70 to complete the operating circuit. A magnet 72, which is affixed within the switch 70, attracts the rod extension 62 and holds it in engagement with the contacts 66, 68 to assure completion of the electrical energy cycle as hereinafter more fully described.

Referring now to the schematic electric circuit diagram, FIG. 9, electrical current is fed into the circuit 86 through flexible conductors 72' from any convenient source of 110 volt, alternating current, such as an ordinary house convenience outlet 74. A master switch 76 connects in series with one of the conductors 72' and serves as an on-off switch for the circuit. The trip switch 70 also connects in series with one of the conductors 72' and triggers the operation of the clock-timer 78 for timed control of the primary of the transformer 80. The transformer 80 steps up the 110 volt incoming voltage to approximately 480 volts in the secondary winding and feeds the high voltage current to the grids 82, 84. It will be noted that the grids 82, 84 are of opposite polarity and that the circuit 86 is open between the grids. Only the presence of an external object extending between the grids completes the circuit. It is thus seen that a rodent 52, upon entering the chamber 12 and standing upon the grids 82, 84 will receive the full effect of the high voltage secondary current thus impressed upon the grids, which will necessarily result in almost instantaneous electrocution. The clock-timer 78 can preferably be set to open after approximately ten seconds of operation to prevent burning or charring of the carcass and any resulting unpleasant odors.

A pilot light 88, which may be amber in color, connects in parallel with the circuit between the master switch 76 and the trip switch 70 to indicate that the circuit is ready for operation. A signal light 90, which may be red in color, connects in parallel with the circuit 86 after trip switch 70 to indicate when the trip switch has closed.

As can be observed in FIGS. 1, 5 and 6, the grids 82, 84 are affixed to the floor 30 of the rodent entrance chamber 12 and are positioned in parallel, horizontally juxtaposed relation. Each grid is constructed with a pair of spaced, longitudinal rails 92, 94 and a plurality of transverse, spaced bars welded or otherwise securely joined to provide a unitary, electrically conductive assembly. The left grid 82 connects to one side of the transformer secondary winding 102 through a conductor 96 and the right grid 84 connects to the second side of the transformer secondary winding 100 through a conductor 98. Care must be exercised to properly insulate and space the grids from each other so as to prevent short circuits.

In order to use the device the cover 46 should be rotated about the pin 48 and bait (not shown) introduced into the bait holding chamber 42. The cover should then be replaced to completely close bait opening 44. The conductors 72' should then be plugged into a convenience outlet 74 and the casing should be placed in an area likely to attract rodents. The master switch 76 can then be closed to activate the device and energize the pilot lamp 88. The device is then ready for use.

Upon attraction of a rodent, the animal will enter the device through the open front 36, and by habit will grasp the grids 82, 84 as it proceeds rearwardly towards the bait. The quest for food will cause the rodent to push the swing baffle 54 rearwardly (FIG. 6) thereby causing the rod extension to close the trip switch 70. The magnet 72 serves to keep switch 70 closed by continuously attracting the rod extension 62. The closing of the trip switch 70 energizes the clock timer 78 which in turn causes the transformer 80 to transmit a timed cycle of high voltage current to the grids 82, 84. The presence of the rodent 52 on the grids causing the shocking current to pass through its body resulting in instantaneous electrocutions. The tripping of the switch 70 also energizes the signal lamp 90 to indicate successful operation. Upon completion of the timed cycle of operation of the clock timer 78, current through the transformer ceases, but the signal lamp 90 remains lit.

The carcass can then be removed without trouble by simply lifting the unit by the handle 38 and dumping it into a suitable disposal receptacle. The unit can be reset for additional operation simply by turning the knob 104 to disengage the rod extension 62 from the attraction of the magnet 72. Additional bait need not be added inasmuch as there can be no actual contact between the rodent and the bait.

Although I have described my invention with a certain degree of particularity, it is understood that the present disclosure has been made only by way of example and that numerous changes in the details of construction and the combination and arrangement of parts may be resorted to without departing from the spirit and scope of the invention.

What is claimed is:
1. In an eletcrically operated rodent exterminator, the combination of:
   (A) a casing,
       (1) said casing being interiorly divided into a rodent entrance chamber, a bait holding chamber and an equipment chamber,
       (2) said casing being provided with bait odor emitting openings;
   (B) electrical grid means arranged at the floor of the said rodent entrance chamber,
       (1) said grid means having current carrying portions of opposite electrical polarity;
   (C) an electrical circuit feeding current to the said grid means,
       (1) said circuit deriving its energy from a readily available current source;
   (D) circuit actuating means operable upon action of a rodent approaching the said bait chamber

(1) the said circuit actuating means including a pivotal operating rod having a depending ferrous portion and normally open switch contacts arranged for closure upon communication with the depending portion of the said operating rod, and (2) a magnet located to hold the said depending portion in communication with the said switch contacts;

(E) and timer means arranged to deactivate the said electrical circuit after passage of a predetermined interval of time.

References Cited

UNITED STATES PATENTS

| 1,024,969 | 4/1912 | Bowen | 43—99 |
| 2,398,188 | 4/1946 | Meehan | 43—99 |
| 2,995,862 | 8/1961 | Pimentel | 43—99 |
| 3,007,277 | 11/1961 | Anderson | 43—99 |

FOREIGN PATENTS

| 16,065 | 1911 | Great Britain. |

WARNER H. CAMP, Primary Examiner